United States Patent
Book et al.

(10) Patent No.: US 7,529,355 B2
(45) Date of Patent: May 5, 2009

(54) REPORT DATA CAPTURE VIA BILLING MODULE

(75) Inventors: Nancy Ann Book, Palatine, IL (US); Brian Smith, Dallas, TX (US); Susanne Marie Crockett, Buffalo Grove, IL (US); Denis F. Nolan, Tracy, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 968 days.

(21) Appl. No.: 11/022,861

(22) Filed: Dec. 28, 2004

(65) Prior Publication Data

US 2006/0140367 A1    Jun. 29, 2006

(51) Int. Cl.
*H04M 15/00* (2006.01)

(52) U.S. Cl. .............................. 379/112.06; 379/114.01

(58) Field of Classification Search ................. 379/111, 379/112.01, 112.06, 112.07, 114.01, 114.28, 379/114.29, 121.01, 121.04, 121.05, 126
See application file for complete search history.

(56) References Cited

U.S. PATENT DOCUMENTS

| | | | |
|---|---|---|---|
| 5,425,087 A * | 6/1995 | Gerber et al. ............... 379/134 |
| 5,465,378 A * | 11/1995 | Duensing et al. ............ 715/233 |
| 5,799,073 A | 8/1998 | Fleischer, III et al. |
| 5,896,445 A * | 4/1999 | Kay et al. .................... 379/135 |
| 5,946,406 A * | 8/1999 | Frink et al. .................. 382/119 |
| 6,011,837 A * | 1/2000 | Malik ........................ 379/114.1 |
| 6,052,448 A * | 4/2000 | Janning .................. 379/115.01 |
| 6,490,345 B2 | 12/2002 | Fleischer, III et al. |
| 6,771,753 B2 | 8/2004 | Fleischer, III et al. |
| 6,850,605 B2 | 2/2005 | Tiliks et al. |
| 6,965,668 B2 | 11/2005 | Clark et al. |
| 6,985,568 B2 | 1/2006 | Fleischer, III et al. |
| 2002/0031210 A1 * | 3/2002 | Mohn et al. ............ 379/114.01 |
| 2004/0240647 A1 | 12/2004 | Tiliks et al. |
| 2005/0078813 A1 | 4/2005 | Tiliks et al. |
| 2005/0243985 A1 | 11/2005 | Clark et al. |

* cited by examiner

*Primary Examiner*—Binh K Tieu
(74) *Attorney, Agent, or Firm*—Greenblum & Bernstein, P.L.C.

(57) ABSTRACT

A system is provided for reporting call data related to a telecommunications service. The system includes a network element, such as a service control point, that generates billing records. The network element populates a base module with standard data and also populates a local use module, appended to the base module, with call data required for reports associated with the telecommunication service. The system also includes a report generating system that receives the base record and appended local use module and generates reports based upon the call data stored in the base module and the appended local use module.

20 Claims, 1 Drawing Sheet

REPORT DATA CAPTURE VIA BILLING MODULE

BACKGROUND OF THE INVENTION

1. Field of the Invention

The present invention relates to the field of telecommunications. More particularly, the present invention relates to capturing report data by use of a billing module.

2. Background Information

The ability to generate reports for advanced intelligent network (AIN) telecommunications services is highly desirable. Although billing features are provided for such services, reports do not always use the same data that is captured for bills.

Although a switch could be used to capture data required for the reports, relying on the switch consumes excessive network resources. That is, if the switch collects such data, the switch is tied up for the length of the call. Thus, another network element should be used to capture the appropriate data.

Other networks elements, such as a service control point, typically operate with data in a rigid pre-established standardized format. If additional data for the reports is desired, modifications to the format will be required. In this case, each service control point and each billing system in the telecommunications network has to be updated to be able to operate with the new format: a very burdensome process.

Another problem with trying to use billing data to generate reports is the frequency the data is received. Usually, billing systems are only updated once or twice a day. Because billing is generally not in real time, billing systems have no need for real time updates. In addition, schedules for forwarding data are usually pre-established and are difficult to modify. There is a need, however, for real time report generation.

Thus, it would be desirable to have a system that not only collects information in addition to the standard billing data, but also provides such information in a near real time manner.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which.

DETAILED DESCRIPTION OF EMBODIMENTS

Figure 1:
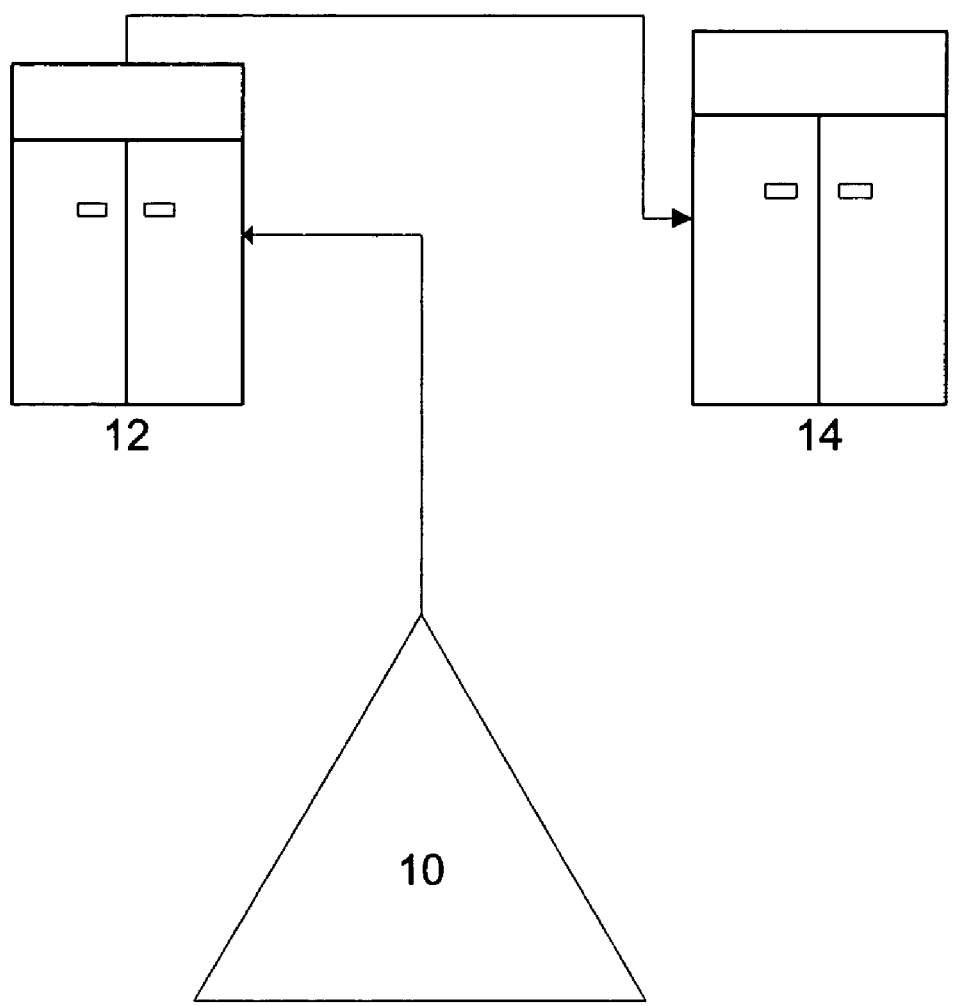
FIG. 1 is a diagram showing an exemplary environment in which an aspect of the present invention operates.

According to the present invention, custom report data can be captured from standardized telecommunications systems, without modifying the systems themselves.

In view of the above, the present invention through one or more of its various aspects and/or embodiments is presented to accomplish one or more objectives and advantages, such as those noted below.

According to an aspect of the present invention, a method is provided for reporting call data related to a telecommunications service. The method includes receiving, at a report generating system, a base module storing standardized data. The method also includes receiving, at the report generating system, a local use module appended to the base module, the local use module storing data specific to reports. The local use module data is not provided by the base module.

In one embodiment, the receiving occurs periodically, for example, every minute. The telecommunications service may be a call transfer service.

In another aspect, a method is provided for collecting call data, in order to generate reports, from a network element that generates billing records. The method includes appending at least one local use module to a base module for reporting purposes. The appended module includes fields that the network element populates.

In one embodiment, a toll free reporting tool periodically receives the base module and appended local use module from the network element and generates reports based upon the data in the base module and the local use module. The receiving can occur every minute.

In another aspect, a system is provided for reporting call data related to a telecommunications service. The system includes a network element that generates billing records, the network element populating a base module with standard data and populating a local use module appended to the base module, with call data required for reports associated with the telecommunication service. The system also includes a report generating system that receives the base record and appended local use module and generates reports based upon the call data stored in the base module and the appended local use module.

The network element can be a service control point. The reporting system can be a toll free reporting tool. The reporting system can alternatively be a USAN platform.

In yet another aspect, a computer readable medium stores a program for reporting call data related to a telecommunications service. The program includes a receiving code segment that receives a base module storing standardized data, and a local use module appended to the base module. The local use module stores data specific to reports, the local use module data not being provided by the base module.

In one embodiment, the receiving code segment periodically receives the data, e.g., every minute. The telecommunications service can be a call transfer service.

In still another aspect, a computer readable medium stores a program for collecting call data, in order to generate reports, from a network element that generates billing records. The program includes an appending code segment that appends at least one local use module to a base module for reporting purposes. The appended module includes fields that the network element populates.

In another embodiment, a receiving segment periodically receives the base module and appended local use module from the network element and generates reports based upon the data in the base module and the appended local use module. The receiving can occur every minute.

The various aspects and embodiments of the present invention are described in detail below.

Referring to FIG. 1, a network element that generates reports 10, for example, an Alcatel service control point (SCP) available from Compagnie Financière Alcatel, can be used to capture data, both for billing and for reporting purposes. Typically, the SCP 10 creates an exchange message interface (EMI) record including a base module, such as the industry standard 010125 module. The module is populated with standardized data used for billing purposes.

Because the base module does not include all data necessary for report generation, according to an aspect of the present invention, a local use module is appended to the base module. The local use module requests additional data that can be used for generating reports. The telecommunications carrier can define the various fields in the local use module to collect specific data for use in reports.

Once populated by the SCP 10, the base module and the appended local use module are forwarded to a storage system 12, such as a network information storage system (NISS) server. In one embodiment, the NISS server runs on a Sun Sparc SUNW Netra-T4 platform, available from Sun Microsystems, Inc. Although the storage system 12 generally ignores the appended module, the storage system 12 can use some of the data from the appended local use module if desired.

A reporting system 14, such as a toll free reporting tool which operates on a Sun 6800 platform, available from Sun Microsystems, Inc. receives the base module and the appended local use module from the storage system 12. In one embodiment, the data is pulled from the storage system 12 every minute. With the data from the base module and the appended local use module, the reporting system 14 can generate any desired reports.

In an embodiment, a USAN service node (available from USAN, Inc.) is provided instead of a NISS. Although USAN platforms are already capable of collecting data and generating reports, in this embodiment, the toll free reporting tool generates the reports. Thus, the USAN platform should populate the appended local use module to facilitate report generation by the toll free reporting tool.

In another embodiment of the present invention, the local use module is appended to collect data for reporting a call transfer service. In this embodiment, the collected data includes: a record ID, a module length, a date of the record, a terminating switch ID, a final trunk group, a transfer to toll free number, a transfer indicator, a call transfer service sequence number, and a DNIS field. The transfer indicator indicates whether the caller is a subscriber to the call transfer service, and if so, whether or not a transfer was required. The call transfer sequence number is used to associate all legs of a call. For example, if a call has two legs, the record for each leg will have the same sequence number. The record ID is an identification of the record itself. The module length indicates how many characters are in the module. The record date indicates the date the record was created. The terminating switch ID indicates the ID of the terminating switch. The final trunk group indicates the terminating trunk group. The transfer to toll free number indicates the number to which the call was transferred. The DNIS field indicates the dialed number.

Thus, the present invention enables generation of reports using data in addition to the standardized data captured for billing.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. For example, although a single module has been described as being appended to the base module, additional modules can be appended to collect data for additional reports. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for public telephone networks (e.g., AIN) represents an example of the state of the art. Such standards are periodically superseded by faster or more efficient equivalents having essentially the same functions. Accordingly, replacement standards and protocols having the same functions are considered equivalents.

What is claimed is:

1. A method for reporting telecommunications system usage data related to a telecommunications service by use of a billing system, comprising:

receiving, at a report generating system, a base module comprising standard billing data associated with calls made using the telecommunications service;

receiving, at the report generating system, a local use module appended to the base module, the local use module comprising data specific to usage of the telecommunications system to provide the telecommunications service;

generating billing reports based upon the standard billing data stored in the base module; and generating telecommunications system usage reports based upon the specific telecommunications system usage data stored in the local use module, wherein the standard billing data and the specific telecommunications system usage data are generated from the same set of calls.

2. The method of claim 1, in which the receiving occurs periodically.

3. The method of claim 2, in which the receiving occurs every minute.

4. The method of claim 1, in which the telecommunications service comprises a call transfer service.

5. A method for collecting telecommunications system usage data, in order to generate reports, from a network element that generates billing records, comprising:

providing a base module comprising standard billing data associated with calls made using the telecommunications service;

appending at least one local use module to the base module for reporting purposes, the appended module comprising data specific to usage of the telecommunications system to provide the telecommunications service;

generating billing reports based upon the standard billing data stored in the base module;

generating telecommunications system usage reports based upon the specific telecommunications system usage data stored in the local use module;

wherein the specific telecommunications system usage data in the appended module includes fields that the network element populates with data specific to the usage of the telecommunications system to provide the telecommunications service;

and wherein the standard billing data and the specific telecommunications system usage data are generated from the same set of calls.

6. The method of claim 5, in which a toll free reporting tool periodically receives the base module and appended local use module from the network element and generates reports based upon the data in the base module and the local use module.

7. The method of claim 6, in which the receiving occurs every minute.

8. A system for reporting telecommunications system usage data related to a telecommunications service, comprising:

a network element that generates billing records, the network element populating a base module with standard billing data associated with calls made using the telecommunications service and populating a local use module appended to the base module, with data specific to usage of the telecommunications system to provide the telecommunications service required for reports associated with the telecommunication service; and a report generating system that receives the base module and appended local use module and generates billing reports based upon the standard billing data stored in the base module and generates telecommunications system usage reports based upon the specific telecommunications system usage data stored in the appended local use module;

wherein the standard billing data and the specific telecommunications system usage data are generated from the same set of calls.

9. The system of claim 8, in which the network element comprises a service control point.

10. The system of claim 8, in which the reporting system comprises a toll free reporting tool.

11. The system of claim 8, in which the reporting system comprises a service node.

12. A computer readable medium storing a program for reporting telecommunications system usage data related to a telecommunications service, comprising:

a receiving code segment that receives one type of data for a base module comprising standard billing data associated with calls made using the telecommunications service, and another type of data for a local use module appended to the base module, the local use module comprising data specific to the usage of a telecommunications system to provide the telecommunications service;

a generating billing reports segment that generates billing reports based upon the standard billing data stored in the base module;

a generating telecommunications system usage reports segment that generates telecommunications system usage reports based upon the specific telecommunications system usage data stored in the local use module;

wherein the standard billing data and the specific telecommunications system usage data are generated from the same set of calls.

13. The medium of claim 12, in which the receiving code segment periodically receives data.

14. The medium of claim 13, in which the receiving occurs every minute.

15. The medium of claim 12, in which the telecommunications service comprises a call transfer service.

16. A computer readable medium storing a program for collecting telecommunications system usage data, in order to generate reports, from a network element that generates billing records, comprising:

a base module segment that provides a base module comprising standard billing data associated with calls made using a telecommunications service; and an appending code segment that appends at least one local use module to the base module for reporting purposes, the appended module comprising data specific to usage of the telecommunications system to provide the telecommunications service;

a generating billing reports segment that generates billing reports based upon the standard billing data stored in the base module;

a generating telecommunications system usage reports segment that generates telecommunications system usage reports based upon the specific telecommunications system usage data stored in the local use module;

wherein the specific telecommunications system usage data in the appending module includes fields that the network element populates with data specific to the usage of the telecommunications system to provide the telecommunications service;

and wherein the standard billing data and the specific telecommunications system usage data are generated from the same set of calls.

17. The medium of claim 16, further comprising a receiving segment that periodically receives one type of data for the base module and another type of data for the appended local use module from the network element.

18. The medium of claim 17, in which the receiving occurs every minute.

19. The method of claim 4, wherein each record in the specific system usage data in the local use module includes a record identifier, a terminating switch identifier, a transfer indicator, and a call transfer sequence number that is used to associate all legs of a call.

20. The method of claim 5, wherein each record in the specific system usage data in the local use module includes a record identifier, a terminating switch identifier, a transfer indicator, and a call transfer sequence number that is used to associate all legs of a call.

* * * * *